United States Patent Office 2,985,687
Patented May 23, 1961

2,985,687

PURIFICATION OF BETA-NAPHTHOL

Jack H. Thelin and Gerard N. Vriens, Somerville, and Eugene C. Medcalf, Bound Brook, N.J., assignors to American Cyanamid Company, New York, N.Y., a corporation of Maine No Drawing. Filed Sept. 11, 1957, Ser. No. 683,230

7 Claims. (Cl. 260—621)

This invention relates to the purification of beta-naphthol. This application is a continuation-in-part of our application Serial No. 365,261, filed June 30, 1953, entitled "Purification of Beta Naphthol," now abandoned.

There has recently been developed a process of preparing beta-naphthol by oxidizing dialkylmethylnaphthalenes such as beta-isopropylnaphthalene, beta-sec.-butylnaphthalene, etc. to the corresponding hydroperoxides, and then cleaving the hydroperoxides by reaction with an acid to produce a mixture containing a dialkyl ketone and beta-naphthol. The oxidation process of isopropylnaphthalene to the hydroperoxide is not carried to completion, a mixture being obtained beyond which further oxidation in the same stage is economically unattractive. As a result, the mixture obtained by the acid cleavage of the hydroperoxide contains, in addition to the beta-naphthol and acetone, unreacted isopropylnaphthalene and by-products, e.g., dimethyl-naphthyl carbinol, methylnaphthyl ketone, etc.

The boiling point of the acetone is sufficiently low so that it can readily be recovered by distillation.

The term "crude beta-naphthol" as used throughout the specification and claims is to be understood to mean beta-naphthol and phenolic impurities associated therewith which have been separated from the non-phenolic constituents occurring in the oxidation and cleavage product produced as hereinabove described.

The crude beta-naphthol is usually separated from the non-phenolic constituents by extraction with aqueous caustic alkali, precipitation with acid followed by filtering, washing, and drying.

Ordinary distillation at atmospheric pressure of the crude beta-naphthol thus obtained, has failed to produce a commercially acceptable product. In the ordinary distillation procedures, the distillate has a strong yellow color which destroys the commercial value of the product. Apparently, the crude beta-naphthol produced by the above-described process is contaminated with a substantial amount of impurity which is not removed by any of the conventional processing steps.

In accordance with the present invention, we have discovered that when a small amount of an alkali metal, or an alkali metal hydroxide, or an alkali metal salt of an acid having a dissociation constant not appreciably greater than beta-naphthol is added to the crude prior to distillation, a white product is obtained which is free from colored impurities and which is entirely acceptable commercially. The resulting product possesses excellent color stability on standing and does not develop any undesirable yellowish tinge on storage.

It is not known why the process of the present invention so unexpectedly produces purified beta-naphthol so completely free of colored impurities, and, therefore, no theory is advanced as to why the alkali works so successfully in the process. It is an observable fact, however, that the described process results in the production of white beta-naphthol of excellent color stability as contrasted to the colored product produced by ordinary distillation procedures.

In carrying out the present invention, we may use the alkali metals, lithium, sodium potassium, rubidium or cesium or their hydroxides in solid form or as solutions. Or we may use the alkali metal salt of an acid having a dissociation constant not appreciably greater than beta-naphthol such as, for example, the disodium salt of 2,6-dihydroxynaphthalene. Or we may use an alkali metal salt or beta-naphthol.

The alkali metal salt must be one which in the acid state has such volatility as to not contaminate the beta-naphthol. Obviously an alkali metal salt of beta-naphthol gives excellent results, as the released beta-naphthol is the product desired. The disodium salt of 2,6-dihydroxy naphthalene, or other alkali metal salt of a dihydroxy naphthalene or alkali metal salt of a dinaphthol is satisfactory, as the vacuum distillation separates the beta-naphthol from the residual dihydroxy naphthalene, or dinaphthol.

The impurity content of the crude beta-naphthol as produced by the foregoing-described process, may vary slightly depending upon the operating conditions; therefore, the amount of alkali which is added to the crude prior to distillation may also vary. In general, it suffices for purposes of the present invention that there be present during the distillation step only sufficient alkali to prevent color formation, but an excess has not been found to produce any injurious effects. About 0.1 to 6 parts per 100 parts by weight of crude beta-naphthol gives good results.

The distillation is accomplished under a vacuum sufficient to keep the beta-naphthol and associated impurities from decomposing. The crude beta-naphthol should not be heated to a temperature above about 220° C., which corresponds to a vapor pressure of 111.5 mm. of mercury. The pressure during the distillation is kept below 100 mm. Pressures below about 5 mm. and above the sublimation pressure are completely operable, but require closer control to prevent solidification of beta-naphthol in the equipment. Conventional pressures for vacuum distillation of about 5 to 25 mm. are preferred.

A water aspirator is a convenient vacuum source for small operations. A steam jet or a mechanical pump may be used for larger scale operations. If the pump is subject to corrosion, a suitable vapor trap may be used. The pressures varies slightly between the still pot and the condensate receiver. The pressure is measured in the receiver, in mm. of mercury absolute. It is difficult to maintain an exact pressure during the distillation, and the small variations that occur with commercial vacuum pumps give satisfactory results.

The invention will be described in greater detail in conjunction with the following specific examples in which the parts are by weight unless otherwise specified.

*Example 1*

Ten parts of crude beta-naphthol (setting point 119.5° C.), obtained by decomposing beta-isopropylnaphthalene hydroperoxide with acid, followed by distilling off the acetone, extracting the beta-naphthol with caustic, acidifying the extract, filtering, washing, and drying, is charged to a still. 0.1 part of solid caustic soda is added. Vacuum and heat are applied and the bulk of the material is distilled over. The product is white in color. The pressure in the receiver is kept at from 10 to 15 mm. of mercury during the distillation.

Ten parts of the same crude is distilled in the same manner but omitting the caustic soda. The distillate has a strong yellow color.

Example 2

Fifty parts of the same crude beta-naphthol as used in Example 1 is distilled in the presence of 2.0 parts of the sodium salt of beta-naphthol, and at a pressure of about 5 mm. of mercury absolute. The resulting product is white in color.

Example 3

Ten parts of the same crude beta-naphthol as used in Example 1 is distilled in the presence of 0.1 part of potassium hydroxide. The distillate is white, and at a pressure of about 100 mm. of mercury absolute in the receiver.

Example 4

To 100 parts of crude beta-naphthol as used in Example 1 is added 2 parts of metallic sodium and the mixture subjected to vacuum distillation as in the preceding examples at a pressure of about 25 mm. of mercury. The distillate is white in color.

Example 5

To 100 parts of crude beta-naphthol as used in Example 1 is added 6 parts of the disodium salt of 2,6-dihydroxynaphthalene and the mixture subjected to the vacuum distillation at about 10 mm. pressure as in the preceding examples. The distillate is white.

Example 6

Fifty parts of crude beta-naphthol (setting point 114.6° C.), obtained by decomposing beta-isopropylnaphthalene hydroperoxide with acid, followed by distilling off the acetone, fractionally extracting the beta-naphthol with aqueous methanol, and evaporating the solvents, is charged to a still. 2.5 parts of solid sodium hydroxide is added and the mixture is distilled under vacuum at a pressure of about 15 mm. of mercury. The distillate is redistilled producing a product white in color. Simple distillation of the crude beta-naphthol without caustic produces a deep orange-yellow product only slightly improved on redistillation.

Example 7

One hundred parts of crude beta-naphthol (setting point 119.5° C.), obtained by oxidizing beta-sec.-butylnaphthalene to the corresponding hydroperoxide, decomposing the hydroperoxide with acid and recovering the beta-naphthol by extraction with aqueous alkali and precipitation with acid, is distilled under vacuum at a pressure of 15 mm. of mercury in the presence of 1 part of solid caustic soda. The distillate is white in color.

Another portion of the same crude is distilled in the same manner without the addition of caustic. The product has a yellowish tinge.

Example 8

One hundred parts of crude beta-naphthol (setting point 119.9° C.), obtained by decomposing beta-isopropylnaphthalene hydroperoxide with acid and recovering the beta-naphthol by extraction with aqueous methanol and evaporation of the solvent, is charged to a still and is subjected to distillation under vacuum at a pressure of about 5 mm. of mercury in the presence of 1 part of solid caustic soda. The distillate is white in color.

Another portion of the same crude is similarly distilled without the addition of caustic. The product has a yellowish tinge.

Example 9

To 100 parts of crude beta-naphthol as used in Example 7 is added 0.25 part of metallic sodium, and the mixture subjected to vacuum distillation at a pressure, measured in the receiver, of 9 mm. of mercury. The distillate is white in color, and storage stable.

Example 10

To 100 parts of crude beta-naphthol as used in Example 1 is added 6 parts of the disodium salt of beta, beta'-dinaphthol, and the mixture is subjected to vacuum distillation at about 10 mm. of mercury. The distillate is white.

We claim:

1. In the method of purifying crude beta-naphthol obtained by oxidizing a dialkylmethylnaphthalene to the corresponding hydroperoxide, acid cleaving the hydroperoxide, and freeing the beta-naphthol from non-phenolic constituents, the step which comprises vacuum distilling at a pressure of from about 5 to 100 mm. of mercury absolute the crude beta-naphthol in the presence of from 0.1 to 6 parts per 100 parts of crude beta-naphthol of a material from the group consisting of an alkali metal, an alkali metal hydroxide, an alkali metal salt of beta-naphthol, an alkali metal salt of dihydroxynaphthalene, and an alkali metal salt of dinaphthol, the beta-naphthol throughout being maintained at a temperature not higher than 220° C.

2. The method according to claim 1 wherein distillation is in the presence of sodium hydroxide.

3. The method according to claim 1 wherein distillation is in the presence of potassium hydroxide.

4. The method according to claim 1 wherein distillation is in the presence of metallic sodium.

5. The method according to claim 1 wherein distillation is in the presence of the sodium salt of beta-naphthol.

6. The method according to claim 1 wherein distillation is in the presence of the disodium salt of 2,6-dihydroxynaphthalene.

7. The method of purifying crude beta-naphthol obtained by oxidizing a dialkylmethylnaphthalene to the corresponding hydroperoxide, and acid cleaving the hydroperoxide which comprises: distilling off the produced ketone, extracting the crude product containing beta-naphthol with aqueous alkali, separating the aqueous extract, acidifying the extract, separating the thus precipitated crude beta-naphthol, adding from 0.1 to 6 parts per 100 parts of crude beta-naphthol of a material from the group consisting of an alkali metal, an alkali metal hydroxide, an alkali metal salt of beta-naphthol, an alkali metal salt of dihydroxynaphthalene, and an alkali metal salt of dinaphthol, and vacuum distilling at a pressure of from about 5 to 100 mm. of mercury absolute in the presence of said material, the beta-naphthol throughout being maintained at a temperature not higher than 220° C.

References Cited in the file of this patent

UNITED STATES PATENTS

| | | |
|---|---|---|
| 1,931,057 | Clemmensen et al. | Oct. 17, 1933 |
| 2,301,709 | Rumscheidt | Nov. 10, 1942 |
| 2,302,600 | Cislak et al. | Nov. 17, 1942 |
| 2,727,927 | Vriens et al. | Dec. 20, 1955 |
| 2,776,322 | Webster et al. | Jan. 1, 1957 |

UNITED STATES PATENT OFFICE
CERTIFICATE OF CORRECTION

Patent No. 2,985,687  May 23, 1961

Jack H. Thelin et al.

It is hereby certified that error appears in the above numbered patent requiring correction and that the said Letters Patent should read as corrected below.

Column 2, line 10, for "or" read -- of --; line 47, for "pressures" read -- pressure --.

Signed and sealed this 17th day of October 1961.

(SEAL)

Attest:

ERNEST W. SWIDER
Attesting Officer

DAVID L. LADD
Commissioner of Patents

USCOMM-DC